US 3,658,825
Patented Apr. 25, 1972

3,658,825
THIOMETHYL DERIVATIVE OF PYRIDOXAL AND CERTAIN PYRIDOXAMINES
Gustav Schorre, Herbert Nowak, and Otto Saiko, Darmstadt, Germany, assignors to Merck Patent Gesellschaft mit beschrankter Haftung, Darmstadt, Germany
No Drawing. Filed Dec. 4, 1969, Ser. No. 882,348
Claims priority, application Germany, Dec. 5, 1968,
P 18 12 794.1
Int. Cl. C07d 31/50
U.S. Cl. 260—294.8 G  7 Claims

ABSTRACT OF THE DISCLOSURE 5-methylthiomethyl-pyridines having electroencephalogram-modifying and anti-lipidic activity of the formula

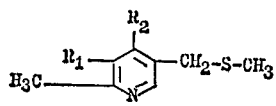

wherein $R_1$ is OH and $R_2$ is —CHO or —$CH_2NR_3R_4$ in which $R_3$ and $R_4$ are H or lower-alkyl or, collectively a methylene chain containing 4 or 5 carbon atoms, or $R_1$ and $R_2$ collectively are a group of the formula

—O—$CR_5R_6$—O—CHOH— in which $R_5$ and $R_6$ have the same values as $R_3$ and $R_4$ or, when $R_6$ is H, $R_5$ can be also an unsubstituted or substituted phenyl group.

SUMMARY OF THE INVENTION

The free base form of the compounds of this invention have the formula:

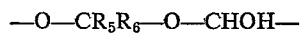

wherein R is —$SCH_3$
and $R_2$ is

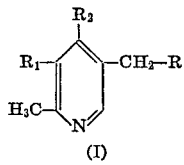

or

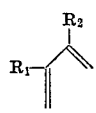

or

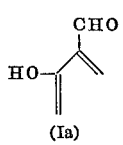

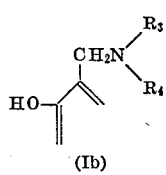

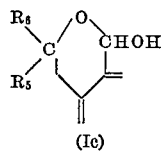

and $R_3$ and $R_4$, which can be the same or different, are H, lower alkyl or, collectively, —$(CH_2)_4$— or

—$(CH_2)_5$— and $R_5$ and $R_6$ have the same values as $R_3$ or $R_4$, respectively, and additionally, where $R_6$ is H, $R_5$ can be phenyl or phenyl substituted by one or more of $NO_2$, $CH_3O$, lower alkyl and halogen.

The pharmacological activity of the compounds of this invention manifests itself, for example, in an improvement in the electroencephalogram, especially in case of oxygen deficiency. Surprisingly, the favorable effect occurs relatively rapidly after treatment with these compounds is initiated.

The compounds of Formula I and the salts thereof also exhibit serum lipid-level-lowering effects.

It is an object of this invention to provide sulfur-containing pyridine derivatives of Formula I and the salts thereof. It is another object to provide processes for their preparation. Other objects will be apparent to those skilled in the art to which this invention pertains.

DETAILED DESCRIPTION OF THE INVENTION

The compounds of Formula I and the salts thereof can be prepared in accordance with processes which are simple to conduct, in various modes of operation.

The compounds of this invention can be prepared by the following processes.

(a) A 2 - methyl - 5 - thiomethyl - pyridine otherwise corresponding to Formula I wherein R is —SX in which X is H, an alkali-metal cation, or a chemical equivalent of an alkaline earth metal cation, an alkyl or substituted alkyl group of at least 2 carbon atoms, an aryl, aralkyl or substituted aryl or aralkyl group, or a group of the formula:

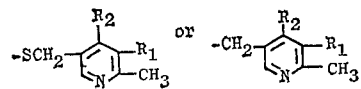

wherein in each instance $R_1$ and $R_2$, in addition to having the values given above, can also be present in blocked form, or a salt thereof (II) is treated with a methylating agent.

(b) A 2 - methyl-pyridine otherwise corresponding to Formula I wherein R is a group exchangeable for —$SCH_3$, and $R_1$ and $R_2$ have the values given above in (a), or a salt thereof (III), is reacted with a methylmercapto compound of the formula $X_1SCH_3$ (IV) wherein $X_1$ is H or an alkalimetal cation or a chemical equivalent of an alkaline earth metal cation.

(c) A 2-methyl-pyridine otherwise corresponding to Formula I wherein R is —$SCH_3$, or a group convertible thereto by hydrogenolysis and/or hydrolysis, $R_1$ is OH or blocked OH and $R_2$ is —CHO or —$CH_2NR_3R_4$-group, or the corresponding blocked groups, preferably a group reducible to —$CH_2NR_3R_4$ (Va) or a corresponding pyridine oxide of the formula

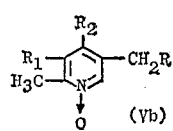

wherein R, $R_1$, and $R_2$ have the values given for Formula Va or the salts thereof, are treated with hydrogenolyzing and/or hydrolyzing agents, thus producing a compound of Formula I wherein $R_1$=OH and $R_2$=CHO or $CH_2NR_3R_4$ with the provision that of the compounds of Formula Va, at least one of R, $R_1$ and $R_2$ can be hydrogenated or hydrolyzed, i.e., excluded as starting compounds are compounds of Formula Va wherein $R_1$=OH, $R_2$=—CHO or —$CH_2NR_3R_4$ and R=—$SCH_3$.

(d) A 2-methyl - 5 - methylthiomethyl-pyridine otherwise corresponding to Formula I wherein R is —S—$CH_3$, $R_1$ is —OH or blocked —OH and $R_2$ is —$CH_2NH_2$ or a group which can be converted into —CHO by oxidation or the salts thereof (VI) are treated with an oxidation agent or with an excess of an α-keto acid, thus obtaining a compound corresponding to Formula I wherein $R_2$=CHO and $R_1$ is OH or the corresponding compound in which the —OH group is still blocked.

(e) A 2-methyl-5-methylthiomethyl-pyridine otherwise corresponding to Formula I wherein R is —$SCH_3$, $R_1$ is —OH or blocked—OH and $R_2$ is —$CH_2Z$ in which Z is a group which can be replaced by the amino group —$NR_3R_4$, or the acid addition salts thereof (VIIa) are reacted with an amine of the formula $HNR_3R_4$ (VIII) wherein $R_3$ and $R_4$ have the values given above; or a corresponding 2 - methyl - 4 - formyl - 5 - methylthio-methyl-pyridine compound wherein $R_2$ is —CHO (VIIb) or its acid addition salt is reacted with an excess of an α-amino acid, or a corresponding 2-methyl-4-aminomethyl-5-methylthiomethyl-pyridine derivative wherein $R_2$ is —$CH_2NHR_7$ (VIIc) wherein $R_7$ is H, lower alkyl, or acyl, are reacted with a lower-alkylating agent, thus obtaining compounds of Formula I wherein $$R_2 = -CH_2NR_3R_4$$

and $R_1$=OH, or the corresponding compounds in which $R_1$ is a blocked —OH group and/or one of $R_3$ and $R_4$ is an acyl group.

(f) A 2-methyl-5-methylthiomethyl-pyridine otherwise corresponding to Formula I wherein R is —$SCH_3$, $R_1$ is OH or blocked OH and $R_2$ is

in which $X_2$ is an alkali metal cation or one equivalent of an alkaline earth metal cation, or the acid addition salts thereof (IX), are reacted with a carbonyl compound of the formula $R_5R_6C=O(X)$ wherein $R_5$ and $R_6$ have the values given above, thus obtaining compounds of Formula Ic.

(g) A disulfide otherwise corresponding to Formula I, but wherein R—$SSCH_3$, or the acid addition salts thereof (XI), are converted, by treatment with an organic phosphorus (III) compound, into the thioether of the above Formula I.

In any of the thus-obtained products in which $R_1$ and/or $R_2$ are blocked, these groups can be freed by conventional procedures, e.g., hydrolysis or hydrogenolysis. Where the free base form of the compounds of Formula I are obtained, they can be converted into the acid addition salts, quaternary ammonium salts, or tertiary sulfonium salts thereof. Conversely, the free bases can be obtained from the acid addition salts or quaternary ammonium salts or sulfonium salts thereof by conventional procedures.

In the compounds of Formula I of this invention, $R_3$ and $R_4$, which can be identical or different can each be H, lower-alkyl, e.g., $CH_3$, $C_2H_5$, n-$C_3H_7$, n-$C_4H_9$, tert.-$C_4H_9$, $C_5H_{11}$, and, collectively, can be tetra- or pentamethylene. Preferably, $R_3$ and $R_4$ are H, $CH_3$ or $C_2H_5$. Also, $R_3$ and $R_4$ preferably are identical.

As stated above, $R_5$ and $R_6$ can have the same values as $R_3$ and $R_4$ and, additionally, when $R_6$=H, $R_5$ can also be a phenyl group which is unsubstituted or can be substituted by one or more of $NO_2$, $CH_3O$ and/or lower alkyl, e.g., $CH_3$, $C_2H_5$, i-$C_3H_7$, n-$C_3H_7$, preferably $CH_3$, and/or halogen, preferably Cl or Br, preferably 1 to 3 of such groups, most preferably one. Examples of such substituted phenyl groups are: nitrophenyl, preferably p-nitrophenyl, tolyl, preferably p-tolyl, chloro- or bromophenyl, preferably p- or m-chlorophenyl, methoxyphenyl, preferably p-methoxyphenyl and 3,4-dimethoxyphenyl. Preferred $R_5$ and $R_6$ groups are $CH_3$, $C_2H_5$ and most preferably H. Especially preferred are compounds of Formula I wherein both $R_5$ and $R_6$=H. When $R_5$ and $R_6$ are identical, they preferably are H or methyl.

Examples of especially preferred compounds of Formula I are:

2-methyl-3-hydroxy-4-formyl-5-methylthiomethyl-pyridine;
2-methyl-3-hydroxy-4-aminomethyl-5-methylthiomethyl-pyridine;
2-methyl-3-hydroxy-4-dimethylaminomethyl-5-methylthiomethyl-pyridine;
2-methyl-3-hydroxy-4-diethylaminomethyl-5-methylthiomethyl-pyridine;
2-methyl-3-hydroxy-4-methylaminomethyl-5-methylthiomethyl-pyridine;
2-methyl-3-hydroxy-4-ethylaminomethyl-5-methylthiomethyl-pyridine;
2-methyl-3-hydroxy-4-piperidinomethyl-5-methylthiomethyl-pyridine;
4-hydroxy-5-methylthiomethyl-8-methyl-4H-m-dioxino [4,5-c]-pyridine;
2,8-dimethyl-4-hydroxy-5-methylthiomethyl-4H-m-dioxino[4,5-c]pyridine;

and the salts, particularly the acid addition salts thereof.

The process of this invention will be described in greater detail below in its various embodiments.

(a) In accordance with version (a), the process aspect of this invention compounds of Formula I are obtained by methylating the corresponding compounds in which R is —SX as defined above and the group

preferably has the Formula Ic, $R_5$, $R_6$ preferably being H and H, H and $CH_3$, or $CH_3$ and $CH_3$ respectively. Alternatively, the hydroxy group thereof can optionally be blocked, e.g. in the form of a lower-alkoxy or lower-acyloxy group, preferably a methoxy, ethoxy or acetoxy.

Other preferred starting compounds for Process (a) are those wherein $R_1$ is a blocked OH, e.g., acyloxy, preferably lower-acyloxy, e.g., acetoxy, or benzoyloxy, and $R_2$ is —$CH_2$—NH-lower-alkyl or —$CH_2$—N(lower-alkyl)$_2$ or acylated, e.g. acetylated or benzoylated aminomethyl, or blocked formyl. The blocked formyl group can, for example, be in the form of —CH=NOH; —CH(O-alkyl)$_2$, particularly —CH—(O-lower-alkyl)$_2$, wherein lower-alkyl is preferably $CH_3$ or $C_2H_5$;

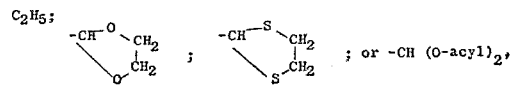

wherein acyl is preferably lower-acyl, e.g. acetyl, propionyl, butyryl, etc.

In the starting compounds X represents preferably an alkali metal cation, especially Na+ or K+.

In order to introduce the methyl group into the starting compounds, suitable means are those usually employed for S-alkylation, e.g., as described in Houben-Weyl, "Methoden der organischen Chemie" [Methods of Organic Chemistry], 4th edition, volume 9 (1955, Georg-Thieme Publishers, Stuttgart, pp. 93 et seq.

For the S-alkylation step, reactive methyl esters are employed, particularly methyl halides, e.g., methyl iodide, methyl bromide, methyl chloride, or methylsulfuric acid esters, e.g., dimethyl sulfate, or methylsulfonic acid esters, e.g., methyl p-toluenesulfonate.

Suitable starting compounds for process (a) are, for example: [2 - methyl-3-hydroxy-4-dimethylaminomethyl-pyrid-5-yl]-methyl mercaptan and the corresponding mercaptides, especially the sodium mercaptide. These starting compounds can be obtained, for example, by reacting the corresponding 5-halomethyl-pyridine compound with alkali hydrogensulfide, thiourea, or potassium thioacetate followed, if desired, by reaction with alkali. They can also be formed, if desired, in the reaction mixture in situ. For example, for the methylation, which in most cases is conducted in an alkaline medium, compounds corresponding to Formula I wherein R is a group that is converted by alkaline treatment into —S⁻ metal⁺, particularly into —S⁻Na⁺ or —S⁻K⁺. In particular, it is possible to employ, for this purpose, the corresponding dithiocarbamates, thiocarbamates, xanthates, thioacetates, isothiuronium compounds, thiocyanates or Bunte's salts

which are compounds otherwise corresponding to Formula I wherein R is

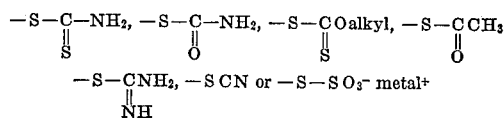

From these preliminary products, a corresponding mercaptide II is formed in an alkaline medium, which mercaptide yields the desired product of this invention (I) by methylation.

The methylation of the starting compounds II is suitably conducted by combining the reactants in an inert solvent, optionally with cooling. For example, to a mercaptide II in an aqueous or alcoholic solution, is added the alkylating agent, e.g., a methyl halide or dimethyl sulfate, in chemical equivalent amounts or in a minor excess. The reaction can be conducted at room temperature by allowing the reaction mixture to stand for a longer period of time. Optionally, it is also possible to operate at a higher temperature, for example, the alkylation can be conducted by heating the mixture for several hours on a steam bath.

With starting compounds II wherein $R_1$ is a free OH-group, and/or R contains an unprotected $NH_2$-group, it is advantageous not to employ the methylation agent in an excess, thus avoiding undesired O- or N-alkylation. However, it is also possible to methylate simultaneously both the S- and N-atoms by employing a starting compound II wherein R( is an OH group which can be blocked, and $R_2$ is aminomethyl or monoalkylaminomethyl.

The mixture can be neutralized after ther eaction is terminated. The desired final product generally precipitates from the solution during cooling, or it is isolated by extraction with a suitable solvent, for example, ethyl acetate.

It is also possible, for example, to methylate, in a conventional manner, a mercaptan II in water or in an alcohol in the presence of an alkali or alkaline earth hydroxide, or of an alkali-metal alcoholate, e.g., sodium methylate or ethylate, in which case there is first produced a mercaptide of Formula II (X=alkali or alkaline earth metal cation). After the reaction is terminated, when alkylating in alcohol, the solvent is suitably removed by evaporation of the mixture. Thereafter, the salts contained in the mixture can be removed by treatment with water, and the thus-formed compounds isolated from the residue by extraction with a suitable organic solvent, such as, for example, ethyl acetate or a chlorinated hydrocarbon, such as chloroform, methylene chloride, trichloroethylene, or ether, and evaporation of the extraction agent.

Starting compounds II wherein X is an undesired group can be converted to compounds of this invention wherein X is $CH_3$ by reaction with a methylating agent under the above-described conditions. Such undesired groups are, for example, an unsubstituted or substituted aryl group, preferably carbocyclic aryl, e.g., containing 6 to 12 carbon atoms and 1 ring or 2 fused or separate rings, phenyl, or phenyl substituted by 1-3 lower-alkyl groups, e.g., $CH_3$, $C_2H_5$, and/or lower-alkoxy groups, e.g., —$OCH_3$, and/or halogen, e.g., Cl or Br; aralkyl groups preferably carbocyclicaralkyl containing 1 ring or 2 separate or fused rings and up to 8 carbon atoms, e.g., benzyl or phenethyl, which can be substituted in the manner described above for the phenyl group; or an alkyl group of at least 2 carbon atoms, e.g., 2 to 20 carbon atoms, for example ethyl, propyl, butyl, or octyl, which group can also be substituted as described above for phenyl. Advantageously, an excess of the methylating agent is employed. Optionally, it is also possible to employ salts, for example sulfonium salts, of the starting compounds II for this reaction.

Especially suitable starting compounds for this variation of version (a) of the process of this invention are compounds II wherein

or

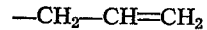

which can be transalkylated, for example with $CH_3I$, into a corresponding compound of this invention I. The more detailed conditions for conducting the transalkylation are described in Houben-Weyl, ed. cit., volume 9 (1955), p. 190; and in "Chem. Ber." [Chemical Reports] 83, 90 (1950), 86, 1049 (1953); and "Liebigs Ann. Chemie" [Liebig's Annals of Chemistry] 566, 139 (1950).

The starting compounds II wherein X is alkyl or substituted alkyl of at least 2 carbon atoms, aryl or aralkyl or substituted aryl or aralkyl, can be obtained, for example, by alkylation or arylation or aralkylation, respectively, of a compound II wherein X is H or an alkali metal or alkaline earth metal cation.

Compounds I of this invention are produced from compounds II wherein X is

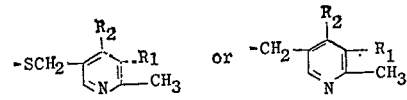

by reaction with a methylating agent, by alkylating cleavage. In this splitting alkylation reaction also, the undesired group X is replaced by the desired methyl residue. Suitable starting substances for this modification of version (a) of the process of this invention are, for example; bis - [2 - methyl - 3 - hydroxy-4-formyl-pyridyl-(5)-methyl]-disulfide, or the corresponding monosulfide, or the corresponding tertiary S-alkyl-salts, for example, the S-methyl-salt. These starting compounds are obtainable, for example, by reacting a compound II wherein X=Na⁺ with a compound III in which R=halogen or by reacting a compound III in which R=halogen with an alkali disulfide, e.g., $Na_2S_2$.

Diazomethane is particularly suitable for introducing the methyl group into a starting compound II wherein X=H. The process can be carried out, for example, under the conditions described in "Neuere Methoden der Praeparativen Organischen Chemie," edited by W. Foerst, Chemie Publishers, Weinheim (1949), 3rd Edition, volume I, pp. 359–412.

As starting compounds for the alkylation according to version (a) of the process aspect of this invention, there can be employed the salts of the basic compounds II, e.g., the quaternary ammonium salts or tertiary sulfonium salts, and especially the acid addition salts thereof.

(b) In accordance with version (b) of the process aspect of this invention, the methyl group is introduced into the starting compound III by reaction with a mercapto compound IV under substantially the same conditions as described above for the alkylation of a starting compound II.

In the starting compounds III, R is a group which can be replace by —$SCH_3$, e.g., by reaction with an alkali metal mercaptide. In particular, R can be halogen, preferably bromine or chlorine, a sulfonyloxy residue of the formula —O—SO$_2$—W, wherein W preferably is phenyl or alkyl, or alkyl or phenyl substituted with, e.g., one or more of lower-alkyl, halogen, lower-alkoxy, e.g.,

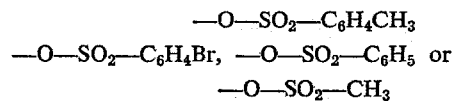

—O—SO$_2$—C$_6$H$_4$Br, —O—SO$_2$—C$_6$H$_5$ or

—O—SO$_2$—CH$_3$ the p-toluenesulfonoxy group being preferred, or a sulfato group, e.g., the radical of a sulfuric acid ester of the formula

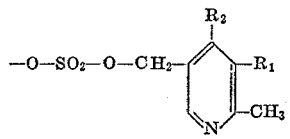

Especially preferred are starting compounds wherein R=halogen, particularly chlorine or bromine. An additional group which can be replaced by —SCH$_3$ is, for example, the azide (—N$_3$) group.

R$_1$ and R$_2$ in the starting compounds III have the meanings given above for starting compounds II. Particularly preferred are compounds III wherein

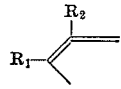

represents the group

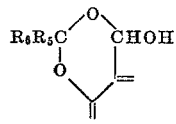

and in this residue, the hydroxy group can also be present, if desired, in blocked form, e.g., in the form of a lower-alkoxy or lower-acyloxy group, especially a methoxy, ethoxy or acetoxy group.

Also preferred are compounds III wherein R$_1$ is a blocked OH and R$_2$ is —CH$_2$NH-lower-alkyl, —CH$_2$N(lower-alkyl)$_2$ or acylated aminomethyl or monoalkylaminomethyl, or blocked —CHO, for example —CH=NOH;

—CH(O-alkyl)$_2$ especially —CH(O-lower alkyl)$_2$, lower-alkyl being preferably CH$_3$ or C$_2$H$_5$, or

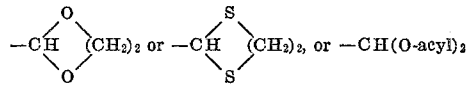

wherein acyl is preferably lower-acyl, e.g., acetyl, propionyl, etc. For example, suitable starting compounds III are 2-methyl-3-hydroxy-4-dimethylamino-5-R-methyl-pyridine (R having the values given above) and the acid addition salts of this compound.

Starting compounds III for this version of the process are obtainable, for example, by the reaction of compounds corresponding to Formula I, but wherein R is substituted by OH, with sulfonic acid chlorides, e.g., p-toluenesulfonic acid chloride. The starting compounds III wherein R=N$_3$ can be produced, for example, by reacting the corresponding compounds III wherein Y=Cl with an alkali azide.

The mercaptans and mercaptides IV employed for the mercapto-methylation according to version (b) of the process can optionally also be formed in the reaction mixture in situ. For example, for the mercaptomethylation, which in most cases is conducted in an alkaline medium, compounds otherwise corresponding to Formula IV can be employed, but which contain, in place of an —SX$_1$, a group which is convertible, by treatment with alkaline compounds, into —S$^\ominus$ metal $^\oplus$, particularly —S$^\ominus$ Na$^\oplus$ or —S$^\ominus$ K$^\oplus$. In particular, there can be employed the corresponding dithiocarbamates, thiocarbamates, xanthates, thioacetates, isothiuronium compounds, thiocyanates or Bunte's salts (CH$_3$CH$_2$SS(O$_2$)ONa), i.e., compounds otherwise corresponding to Formula IV wherein

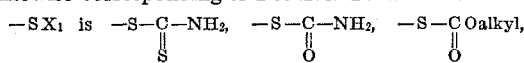

$$-S-\underset{\underset{O}{\|}}{C}CH_3, \quad -S-\underset{\underset{NH}{\|}}{C}NH_2, \quad -SCN, \text{ and } -S-S-O_3^\ominus \text{metal}^\oplus$$

From these preliminary products, a corresponding mercaptide IV is formed in an alkaline medium according to version (b) of the process, which mercaptide is then converted into the desired product I by reaction with the starting compound III.

(c) According to version (c) of the process of this invention, compounds of Formula I wherein R$_1$ represents OH and R$_2$ represents CHO or —CH$_2$NR$_3$R$_4$ are obtained by treating a starting compound V(a) or V(b) or the salts thereof, with hydrogenolyzing and/or hydrolyzing agents.

In this version, the desired final products I are obtained, for example, by splitting off, under alkaline or acidic conditions, blocking groups from the residues R$_1$ and/or R$_2$ in a starting compound V(a) or V(b). Thus, for example, in such a starting compound, an acylated hydroxy group in the 3-position can be liberated by saponification. It is preferred to convert, in this manner, the group R$_1$=lower-acyloxy, preferably acetoxy or also propionyloxy or butyryloxy, or, if desired, benzoyloxy, into a free hydroxy group by hydrolysis. It is also possible to convert an acylated, e.g., an acetylated or benzoylated, aminomethyl or monoalkylaminomethyl group in the 4-position by hydrolysis into the free aminomethyl or monoalkylaminomethyl group. The acyl groups can be split off by acidic agents, e.g., mineral acids, particularly with hydrochloric acid, hydrobromic acid, or sulfuric acid. Others suitable for the acidic hydrolysis step are, for example, hydrobromic acid/glacial acetic acid, pyridine hydrochloride at an optionally elevated temperature, or Lewis acids, especially boron trifluoride or aluminum chloride, in a suitable solvent, e.g., diethyl ether or tetrahydrofuran. An alkaline hydrolysis can be conducted, for example, with alkali-metal hydroxide or carbonate, e.g., sodium or potassium hydroxide or carbonate.

A starting compound V(a) or V(b) wherein R$_2$ is an acetalized formyl groups can be converted into a desired compound I wherein R$_2$=formyl by acidic hydrolysis. The blocked formyl group preferably is one of the following: —CH(O-lower alkyl)$_2$, preferably wherein both lower alkyl residues are either CH$_3$ or C$_2$C$_5$;

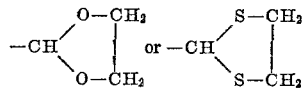

or, if desired,

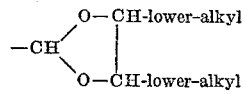

R, R$_1$ and R$_2$ in the starting compounds V(a) and V(b) can be groups which can be converted, by reduction or hydrogenation, respectively, into the corresponding compounds I wherein R$_1$=—OH, R$_2$=—CHO or —CH$_2$NR$_3$R$_4$, and R=—SCH$_3$. For example, the starting material can be a compound V(a) or V(b) wherein R$_1$ is a hydroxy group and R$_2$ is an aminomethyl group blocked by a group which can be split off by hydrogenolysis. Suitable blocking groups are those customarily used in peptide chemistry for blocking amino groups, e.g., benzyl, carbobenzoxy, triphenylmethyl, p-nitrocarbobenzoxy, p-chlorocarbobenzoxy, p-phenylazobenzyloxycarbonyl, p-(p' - methoxyphenylazo)benzyloxycarbonyl, carbo-t-butyloxy. The blocking groups are split off from these substituents by catalytic hydrogenation, with the hydroxy group in the 3-position and/or the aminomethyl group in the 4-position being liberated. Reaction conditions which are employed, for example, are those described in J. P. Greenstein and M. Winitz, "Chemistry of the Amino Acids," Academic Press, New York (1961), vol. 2, pp. 887 et seq.

It is also possible, for example, to convert a starting compound containing the substituents $R_1$=OH, $R_2$= —$CH_2NR_3R_4$, particularly $R_2$=$CH_2N(CH_3)_2$, and in V(b) R=—$SCH_3$ or —$SOCH_3$, and in V(a) R= —$SOCH_3$ or —$SO_2CH_3$, by treatment with a reducing agent, e.g., zinc/dilute hydrochloric acid or iron/hot acetic acid, or phosphorus trichloride or tribromide, into the corresponding compound of Formula I. Preferred is a reduction by warming with ammonium sulfide or heating with phosphorus trichloride, for example, in chloroform, or by treatment with powdered iron in hot acetic acid. Also suitable for converting a starting compound V(b) wherein R=$SOCH_3$ or $SO_2CH_3$ into a final product I is by a catalytic reduction with the customary catalysts, e.g., 5% palladium charcoal or with Raney nickel in suitable solvents, such as ethanol or acetic anhydride. The reduction can also be conducted with sodium borohydride/aluminum chloride at room temperature or with triphenylphosphine at an elevated temperature, or with phosphorus trichloride in chloroform at an elevated temperature. Such a reduction is conducted under conditions known in the literature, e.g., Archiv Pharm. 287, 326 (1954); J. Org. Chem. 18, 534 (1953); Rec. trav. chim. Pays-Bas 70, 581 (1951); J. Pharm. Soc. Japan 71, 1092 (1952); and Houben-Weyl, "Methoden der Organischen Chemie" [Methods of Organic Chemistry], 4th edition, vol. 11/2, p. 200 et seq., G. Thieme Publishers, Stuttgart; and L. F. Fieser and M. Fieser, Reagents for Organic Synthesis, pp. 1053, 1243, and 876, J. Wiley Publishers, New York (1967).

Additional starting compounds V(a) and V(b) which contain an $R_2$ group which can be converted by reduction into

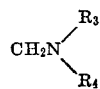

are those wherein $R_2$ is

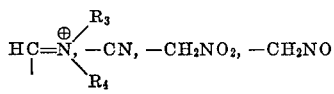

and particularly —CH=NOH. For conversion into the aminomethyl group, reducing agents conventionally employed for such conversion reactions can be used, especially sodium amalgam, sodium in alcohol, other base metals, e.g., zinc, with acids, sodium dithionite or complex metal hydrides. Preferred are those wherein

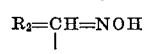

which can, for example, be reduced catalytically to the corresponding compounds of Formula I with the group

in the 4-position.

Further R groups which can be converted into —$SCH_3$ by hydrogenolysis or, optionally, also by hydrolysis are, in particular, —S—$CH_2$-halogen, particularly wherein halogen=Cl, Br or I; —SCHO, wherein the formyl group can optionally be blocked, for example, acetalized; —$SCH_2OH$, wherein optionally the hydroxy group can also be blocked by a group which can be split off by hydrogenolysis or, optionally, also hydrolysis, e.g., carbobenzoxy, triphenylmethyl or benzyl; or —S—COOH or the corresponding esterified group, e.g., —S—$COOCH_3$ or —S—$COOC_2H_5$.

A compound V(a) or V(b) wherein R is —$SCH_2$-halogen, particularly —$SCH_2Br$ or —$SCH_2Cl$, can be converted into a corresponding compound of Formula I by treatment with reducing agents usually employed for the removal of halogen, e.g., zinc/dilute hydrochloric acid in an alcoholic solution, or with sodium in alcohols, or with sodium amalgam/water, or with complex metal hydrides, especially lithium aluminum hydride or sodium borohydride. It is also possible to convert, in this version of the process, a group R=—$SCH_2$-halogen into —$SCH_3$ by catalytic hydrogenation. Suitable catalysts are the conventional heavy metal or noble metal catalysts, especially palladium on calcium carbonate (2.5% palladium content) or palladium on charcoal (5% palladium content). For a more detailed description of the conditions for such reductions, see, for example, Weygand-Hilgetag, ed. cit., pp. 169–172; F. Zymalkowski, "Katalytische Hydrierungen im organisch-chemischen Laboratorium" [Catalytic Hydrogenations in the Organic Chemistry Laboratory], F. Enke Publishers, Stuttgart, 1965, pp. 158–161; Organic Syntheses, Coll. vol. 4, p. 509, Interscience Publishers, New York, 1963; N. G. Gaylord, Reductions with Complex Metal Hydrides, Interscience Publ., New York, 1965, pp. 889–917; A. Hajós "Komplexe Hydride" [Complex Hydrides], and VEB Deutscher Verlag der Wissenschaften, Berlin, 1966, pp. 219 and 267.

A group R=—$SCH_2OH$ in a starting compound V(a) or V(b) can be converted to —$SCH_3$ by reduction with base metals in acids, especially with zinc/acetic acid or dilute hydrochloric acid, or catalytically, e.g., under the conditions set forth in R. L. Augustine, Catalytic Hydrogenation, Techniques and Applications in Organic Synthesis, Edward Arnold Publishers, London, 1965, pp. 135–139, and Weygand-Hilgetag, ed. cit., pp. 177–178.

If desired, a hydroxy group in the group R can be removed after first conducting an esterification with a sulfonic acid, particularly p-toluenesulfonic acid, for example, under the conditions described in L. F. Fieser and M. Fieser, Reagents for Organic Synthesis, p. 1032, J. Wiley & Sons, Inc., New York, 1967.

When R=—S—CHO in a starting compound V(a) or V(b), this group can be reduced to —$SCH_3$ employing methods customary for the reduction of carbonyl groups, e.g., catalytic hydrogenation with, for example, platinum oxide or Raney nickel; reduction with sodium in absolute alcohol, zinc dust in an acidic or alkaline solution, complex metal hydrides, particuarly lithium aluminum hydride, in the presence of aluminum chloride. The conditions which can be employed in this reduction are described, for example, in Weygand-Hilgetag, ed. cit., pp. 178–181; F. Zymalkowski, "Katalytische Hydrierungen im organisch-chemischen Laboratorium" [Catalytic Hydrogenations in the Organic Chemistry Laboratory], ed. cit., pp. 158–161; R. L. Augustine, Catalytic Hydrogenation, Techniques and Applications in Organic Synthesis, ed. cit., pp. 135–139; A. Hajós, "Komplexe Hydride" ed. cit., 1966, pp. 295–306. The preferred reducing agent is lithium aluminum hydride/aluminum chloride.

It is also possible to employ for this reduction organotin hydrides, particularly diphenyltin hydride and di-n-butyltin dihydride, as well as diphenylsilane and a trialkyl borane. Detailed conditions for such a reduction are described in A. Hajós, "Komplexe Hydride" [Complex Hydrides], ed. cit., pp. 288–290.

When R=—S—COOH or esterified —S—COOH, it can be converted into the desired group —S—$CH_3$, by reduction, for example, with lithium aluminum hydride/ aluminum chloride in ether solution. The reaction can be conducted under the conditions described, for example, in A. Hajós, "Komplexe Hydride," VEB Deutscher Verlag der Wissenschaften, Berlin, 1966, pp. 295 et seq.

In addition to the free base form of the compounds V(a) and V(b), it is also possible to use salts thereof as starting substances in this version.

For example, it is possible to reduce salts of compounds otherwise corresponding to Compounds V(a) or V(b) wherein the group in the 1-position is

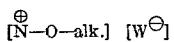

and R is

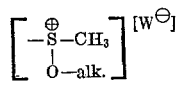

wherein —alk. is an alkyl group which optionally can be substituted, preferably a loweralkyl residue, e.g., $CH_3$ or $C_2H_5$, and $W^{\ominus}$ is an equivalent of an anion, e.g., $Cl^-$, $Br^-$, $I^-$, $1/2\ SO_4^=$, to produce the corresponding compounds of Formula I. In this reduction, conditions are employed suitable for the reduction of amine alkoxides to amines or of O-alkylated sulfoxides to thioethers, using, for example, base metals, such as zinc, with acids or using complex metal hydrides, such as sodium borohydride in ether or tetrahydrofuran, as set forth in A. Hajós, "Komplexe Hydride," VEB Deutscher Verlag der Wissenschaften, Berlin, 1966, pp. 248 et seq.

In accordance with version (c) of the process of this invention, there can be present on compounds V(a) and V(b) saponifiable groups which can be removed with a hydrolyzing agent and reducible groups which can be removed subsequently or prior thereto by treatment with corresponding reducing agents. For example, a starting compound V(b) wherein

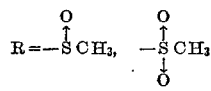

—$SCH_2$-halogen, —SCHO or —$SCH_2OH$, or $R_2$=a blocked formyl or —$CH_2NR_3R_4$— group, can be converted to a compound of Formula I wherein $R_2$=CHO or $CH_2NR_3R_4$, respectively, by reduction or hydrogenation, and thereafter or optionally also prior thereto conversion of a group $R_1$=acylated hydroxy group in a compound V(a) or V(b) into a free hydroxy group by acidic or alkaline saponification.

An acylated hydroxy group present in the 3-position, or an acylated amino group present in the 4'-position, is also liberated by subjecting a starting compound V(a) or V(b) to a reduction with a complex metal hydride, e.g., lithium aluminum hydride, or a reduction or hydrolysis under acidic or alkaline conditions.

The starting compounds V(a) and V(b) are obtainable according to methods known from the literature. For example, compounds V(a) and V(b) containing, as an $R_1$ group, a blocked OH-group and/or as the group $R_2$, an optionally blocked —CHO or —$CH_2NR_3R_4$ group and as an R group, the group —$SCH_3$, can be produced by methylation with a methyl halide of a corresponding compound wherein R is —SH or —$SNa^+$.

(d) According to version (d) of the process of this invention, 2-methyl - 5 - methylthiomethyl-pyridine compounds VI and the salts thereof are converted into the pyridine compounds of Formula I wherein $R_1$=OH and $R_2$=CHO by treatment with an oxidation agent, or, optionally, by reaction with an α-keto acid.

In the starting compounds VI, $R_2$ can be a group convertible to formyl by oxidation. Such groups are, for example, —$CH_2OH$; —$CH_2NR_3R_4$, wherein $R_3$ and $R_4$ have the meanings given for compounds of Formula I and preferably are H; —$CH_2$O-lower-alkyl, particularly —$CH_2OCH_3$; sulfonated $CH_2OH$, especially

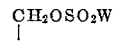

wherein W represents an unsubstituted or substituted phenyl group or lower-alkyl group, especially p-tolyl or p-bromophenyl. Additional groups which can be converted to CHO by oxidation are —$CH_2$-halogen, wherein halogen is, in particular, Cl, Br or I; —$CH_2SH$;

—$CH_2SCH_3$; —$CH_2OSO_3H$; —$CH_2NO_2$; —$CH_2CN$ and —$CH_2N^+(alkyl)_3$. The oxidation of these starting compounds to the corresponding formyl compounds of Formula I is preferably conducted with active manganese dioxide, for example under the conditions described in J. Org. Chem., 33, p. 1337 (1968). A preferred reaction medium is chloroform. Suitable oxidation agents are, for example, dimethyl sulfoxide, potassium permanganate or manganese dioxide. In this connection, the oxidation can be conducted under the conditions described in J. Am. Chem. So., 66, 2088–2092 (1944) or 70, 3434 (1948) or 87, 5661–5678 (1965).

The starting compounds VI can furthermore contain, as other $R_2$ groups which can be converted into the formyl group by oxidation, the group

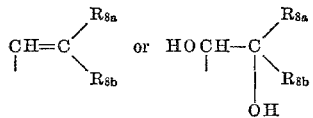

wherein $R_{8a}$ and $R_{8b}$ represent alkyl, aryl or aralkyl groups which optionally can be substituted, for example, with OH, halogen, e.g., Cl or Br, lower alkoxy, e.g., $CH_3O$ or $C_2H_5O$, preferably alkyl of up to 5 carbon atoms, phenyl, benzyl or phenethyl, and most preferably identical unsubstituted lower-alkyl, e.g., methyl or ethyl. A further preferred group of these compounds VI are those containing the group

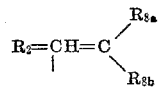

wherein $R_{8a}$ and $R_{8b}$ are groups which exert an activating influence on an adjacent methylene group, e.g., CN, COOH or esterified COOH, especially COOH esterified with lower-alkyl, $CONH_2$, CO-lower-alkyl or CO-aralkyl or CO-aryl, particularly $COCH_2C_6H_5$, $COC_6H_5$, $NO_2$ and optionally substituted sulfonyl. Especially preferred are CN, COOH and esterified COOH. From these starting compounds VI, the formyl compounds I are obtained by mild oxidative splitting under conditions which produce a —CHO rather than a —COOH group. Suitable oxidation agents for this special modification of version (d) are, for example, ozone, lead tetraacetate, periodic acid or periodates, such as sodium periodate.

This reaction can be conducted, for example, in accordance with the conditions described in "Neuere Methoden der praeparativen organischen Chemie," edited by W. Foerst, 3rd edition, Chemie Publishers, Weinheim, 1949, pp. 21 et seq., or Houben-Weyl, "Methoden der Organischen Chemie" [Methods of Organic Chemistry], vol. 7/1, 4th edition, edited by E. Müller, Georg Thieme Publishers, Stuttgart, pp. 333 et seq., or Chemical Reviews 27, 437 (1940).

Furthermore, starting compounds VI containing the group $R_2$=$CH_2NH_2$ can also be converted by reaction with an α-keto acid into a pyridine compound of Formula I wherein $R_2$=CHO. Preferred α-keto acids for this version are, for example, α-keto-glutaric acid, pyruvic acid, α-ketobutyric acid, and alkylated and aralkylated pyruvic acids. The α-keto acid is employed in excess for this conversion reaction. In a starting compound VI having an aminomethyl group in the 4'-position, that group also is converted during this reaction into the formyl group by exchange reaction with the keto oxygen of the α-keto acid.

The starting compounds for version (d) can be produced in accordance with conventional processes. Starting substances VI wherein $R_2$=$CH_2NH_2$ can be obtained, for example, by the reduction of suitable N-containing aldehyde derivatives otherwise corresponding to Formula VI wherein $R_2$=—CH=NOH, by catalytic methods, preferably on platinum oxide, or with base metals and acid, preferably with zinc powder and glacial acetic acid, or with complex metal hydrides.

Starting compounds VI wherein

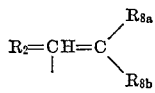

can be produced, for example, by splitting off water, hydrohalic acid or alcohol from corresponding compounds wherein

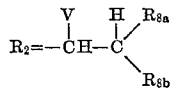

in which V=halogen, OH or alkoxy.

(e) According to version (e) of the process of this invention, 2-methyl - 5 - methylthiomethyl-pyridine compounds VIIa containing in the 4'-position a group which can be converted into the amino group —NR$_3$R$_4$, by treatment with an amine of Formula VIII, into a pyridine compound of Formula I wherein R$_2$=CH$_2$NR$_3$R$_4$. Especially advantageous starting compounds VIIa are those wherein Z is halogen, particularly Cl, Br or I, or a sulfonyloxy group, for example a sulfonyloxy group corresponding to Y in compounds III, particularly p-toluenesulfonyloxy.

Preferred amines VIII are, for example, methylamine, dimethylamine, ethylamine, diethylamine, benzylamine, pyrrolidine, piperidine, dimethylaminoethylamine, and diethylaminoethylamine.

For example, according to this version, 4-halomethyl-3 - hydroxy-2-methyl-5-methylthiomethyl-pyridine is reacted with one of the above-mentioned amines in a suitable solvent, for example in an alcohol, e.g., ethanol, or a hydrocarbon, e.g., benzene. Inter alia, the reaction is conducted at elevated temperature, particularly under reflux conditions. The desired reaction product is generally isolated, after the solvent has been evaporated, as a hydrohalic acid addition salt in crystalline form. The free base form can be converted into the corresponding dihydrohalic acid addition salt by the addition of more hydrohalic acid, for example hydrochloric acid. Especially preferred reactants are amines of Formula VIII wherein R$_3$=H and R$_4$=lower-alkyl, and compounds VIIa wherein Z=Cl.

Additional conditions for this reaction are described, for example, in Houben-Weyl, "Methoden der organischen Chemie" 4th edition, vol. 11/1 pp. 26 et seq. (1957), Georg Thieme Publishers, Stuttgart.

Furthermore, according to version (e), 2-methyl-4-formyl-5-methylthiomethyl-pyridines VIIb are converted by reaction with an amino acid into pyridine compounds of Formula I wherein

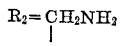

The amino acid is suitably employed in an excess. Preferred amino acids for this reaction are, for example, glutamic acid, α-aminobutyric acid, aspartic acid, alanine, phenylalanine, and serine. The exchange of the oxygen of the formyl group in the starting compound VIIb for an amino group can be conducted, for example, under the conditions described in Karlson, "Lehrbuch der Biochemie," 6th edition (1967), Georg Thieme Publishers, Stuttgart, pp. 135 et seq.

Furthermore, according to version (e), 2-methyl-4-aminomethyl-5-methylthiomethyl-pyridines VIIc are converted by alkylation into a corresponding compound of Formula I wherein R$_2$=CH$_2$NR$_3$R$_4$ and R$_3$ and/or R$_4$ are lower-alkyl. For example, by alkylation with a lower-alkyl ester, particularly a methyl halide, e.g., methyl bromide or iodide, or with dimethyl sulfate, one or two lower-alkyl groups, particularly methyl or ethyl groups, can be introduced in the 4'-position on the nitrogen of the starting compound VIIc. The usual alkylation conditions are employed, e.g., as set forth in version (a), above.

The starting compounds VII can be obtained by processes known in the literature. For example, starting compounds VIIa can be obtained by halogenating a corresponding 4-hydroxymethyl compound, e.g., with thionyl chloride.

(f) In accordance with version (f) of this process starting with 2-methyl-5-methylthiomethyl-pyridine compounds IX, compounds of Formula I wherein

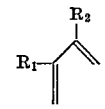

is

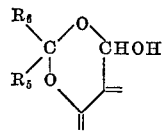

can be obtained by reaction with carbonyl compounds X.

Preferred carbonyl compounds X are corresponding aliphatic or aromatic aldehydes, e.g., formaldehyde, acetaldehyde, propionaldehyde, butyraldehyde, benzaldehyde, benzaldehyde mono- to trisubstituted by NO$_2$, CH$_3$O, CH$_3$ and/or Cl or Br, or corresponding aliphatic, cycloaliphatic or aromatic ketones, e.g., acetone, methyl ethyl ketone, diethyl ketone, cyclopentanone, or cyclohexanone. Especially preferred are acetone, methyl ethyl ketone and cyclohexanone.

The compounds IX can be reacted with the carbonyl compounds X by dissolving them in a water-miscible solvent and then adjusting the reaction mixture to a pH of between 1 and 3, preferably 2, with a mineral acid, for example, hydrochloric acid. After allowing the reaction mixture to stand, generally for about one day at room temperature, the thus-formed product is isolated by removing the solvent by filtration or evaporation, e.g., as described in Houben-Weyl, "Methoden der organischen Chemie," 4th edition (1965), Georg Thieme Publishers, Stuttgart, vol. 6/3, pp. 213–220.

Starting compounds IX can be obtained, for example, by reacting pyridoxal with the above-mentioned carbonyl compounds, subsequently esterifying the 5'-OH-group with sulfuric acid derivatives or sulfonic acid derivatives, and then replacing the esterified group with SCH$_3$.

(g) In accordance with version (g) of this invention, compounds I of this invention can be produced from disulfides otherwise corresponding to Formula I wherein R=SSCH$_3$ by partial desulfuration with a trivalent phosphorus compound of Formula XI

wherein R$_9$, R$_{10}$ and R$_{11}$ are inert organic groups. These groups, which preferably are identical but can be different, preferably are—N(lower-alkyl)$_2$ or lower-alkoxy, e.g., dimethylamino, diethylamino, methoxy, or ethoxy. They can also be lower-alkyl, phenyl, or phenyl substituted by inert groups, for example, tolyl. Especially preferred is tris(diethylamino)phosphine. For the desulfuration reaction, suitable solvents are for example, hydrocarbons, e.g., benzene. The reaction is conducted at room temperature or optionally also at an elevated temperature. For example, the conditions which can be employed are described in J. Am. Chem. Soc. 90, 4181 (1968).

In each of the above versions, when R$_1$ and R$_2$ are in blocked form in the products obtained, the blocking groups are split off subsequently to the main process steps.

In particular, any acylated hydroxy groups in the 3-position or any acylated amino groups in the 4'-position can be liberated in this manner. Preferred agents for splitting off the blocking groups are acidic or alkaline, or optionally also hydrogenating agents. In this connection, the conditions are employed, for example, which are set forth in the above-described version (c).

A free base I obtained in accordance with the process of this invention can be converted into the associated acid addition salt thereof with an acid in a conventional manner. For this reaction, those acids are suitable which yield physiologically acceptable salts. Thus, it is possible to employ organic and inorganic acids, for example aliphatic, alicyclic, araliphatic, aromatic, or heterocyclic mono- or polybasic carboxylic or sulfonic acids, e.g., formic acid, acetic acid, propionic acid, pivalic acid, diethylacetic acid, succinic acid, pimelic acid, fumaric acid, maleic acid, lactic, acid, tartaric acid, malic acid, aminocarboxylic acids, sulfamic acid, benzoic acid, salicylic acid, phenylpropionic acid, citric acid, gluconic acid, ascorbic acid, isonicotinic acid, methanesulfonic acid, ethanedisulfonic acid, $\beta$-hydroxyethanesulfonic acid, p-toluenesulfonic acid, naphthalene-mono- and -disulfonic acids, sulfuric acid, or hydrobromic acid, or phosphoric acids, such as orthophosphoric acid, etc. Preferred in this connection are mineral acids, such as hydrochloric acid or sulfuric acid. Acids which are not physiologically acceptable can be used for isolation, purification and/or characterization purposes.

According to this invention, free bases of Formula I, produced according to one of the above-described modes of conducting the process, can, if desired, be converted into the quaternary amomnium salts and/or tertiary sulfonium salts thereof. This reaction, designated below as "N,S-dialkylation" or "N- or S-monoalkylation," respectively, is conducted with the conventional alkylating agents. The alkylation can be conducted, for example, with alkl halides, preferably with lower-alkyl halides, particularly the iodides, such as methyl iodide, ethyl iodide, propyl iodide, allyl iodide, or also with benzyl iodide; optionally, subsequent to this step, an undesired halide ion, for example I$^{\ominus}$, can be replaced, with the aid of an ion exchanger, by a desired halogen ion, for example Cl$^{\ominus}$ or Br$^{\ominus}$. Also, sulfuric acid esters or sulfonic acid esters are suitable for the reaction.

The formation of quaternary ammonium or tertiary sulfonium salts can be conducted in the presence of a solvent or without a solvent. Especially well suited solvents are those having a high dielectric constant, e.g., chloroform, or nitro compounds, e.g., nitrobenzene or nitromethane, or cyano compounds, e.g., acetonitrile, or optionally benzyl alcohol. The reactions customarily are conducted at room temperature. It is also possible to operate at higher temperatures, if desired.

The rapidly reacting quaternization agents, for example the alkyl iodides, are suitably added in an equimolar ratio whereas the less reactive alkylating agents, e.g., an alkyl chloride, are preferably employed in molar equivalent excess. Optionally, it is also possible to alkylate selectively. For example, the N-alkylation of compounds I is accomplished with less reactive alkylating agents.

In general, for producing quaternary ammonium and/or tertiary sulfonium salts of the compounds of Formula I, alkylating agents preferred are those which contain a lower-alkyl group, especially a methyl group.

A compound of Formula I can also be liberated from a corresponding ammonium and/or sulfonium salt. This reaction is effected by the addiiton of nucleophilic reactants, especially bases, in an inert solvent, or by the addition of a basic-reacting solvent. Suitable nucleophilic reactants, especially bases, are alkali mercaptides, e.g., sodium or potassium mercaptides, which can optionally also be substituted by a hydrocarbon residue, e.g., methyl, ethyl, or benzyl, sodium or potassium mercaptide, alkali thiosulfates, e.g., sodium or potassium thiosulfates, ammonia, or amines, particularly aliphatic amines which are liquid at room temperature, e.g., ethyl-, propyl- or benzylamine, and also ethanolamine. Optionally, the reaction can be conducted in the presence of an inert solvent. Especially suitable inert solvents are alcohols, particularly lower alcohols, such as methanol, ethanol, propanol, isopropanol, or acetone or methyl ethyl ketone.

The bases I can be liberated from the quaternary ammonium or tertiary sulfonium salts thereof, for example, in accordance with the conditions described in Houben-Weyl, ed. cit., vol. 11/1 (1957), pp. 966–991, and in "Chemische Berichte," vol. 90 pp. 395 and 403 (1957).

A free base compound of Formula I can be liberated from an acid addition salt by treatment with an alkaline compound, particularly an alkali hydroxide, such as sodium or potassium hydroxide, or with an alkaline-reacting salt, such as an alkali carbonate, e.g., sodium or potassium carbonate. Then, if desired, the free base can be reconverted into another desired acid addition salt.

The compounds of Formula I can be employed in a mixture with conventional pharmaceutical carriers and other excipients, alone or together with other substances having the same or compatible activity.

The carrier substances can be conventional organic or inorganic materials suitable for parenteral, or enteral application which do not react with the active compounds, such as, for example, water, vegetable oils, polyethylene glycols, gelatin, lactose, amylose, magnesium stearate, talc, Vaseline, cholesterol, etc. For parenteral application, especially suitable are solutions, preferably oily or aqueous solutions, as well as suspensions, emulsions or inplants. For enteral application, it is furthermore possible to employ tablets, pills, capsules, or dragées.

The pharmacological tests were mainly carried out in rats and coquerels.

In certain congenital, geriatric and diseased conditions, the oxygen transport mechanism to the brain is impaired. The result is a loss of or reduction in one or more mental funct ions, e.g., memory, mental acuity, learning capability, motor function, personality, etc. When such a change in mental function is due to abnormal, i.e., reduced, transport of oxygen to the brain, the change can be detected by an alteration from the normal of the electroencephalogram of the afflicted patient; the favorable response resulting from the administration of an effective dose of a compound of this invention can be detected by the improvement in the afflicted mental function and by a return to a more normal electroencephalogram.

The compounds of this invention are preferably employed to improve the encephalograms of mammals whose encephalograms exhibits abnormalities, particularly those indicating an oxygen deficiency. They are preferably administered in dosages of 20 to 500 mg. per dosage unit.

The compounds of this invention are also useful for lowering serum triglyceride or cholesterol levels. For this purpose, they are preferably administered, e.g., in successive dosages of 20 to 500 mg. per dose.

The compounds of this invention are generally administered together with an amount of a pharmaceutically acceptable carrier which provides a convenient unit dosage size, e.g., 1 to 5,000 mg. of carrier per unit does of the compound of Formula I. Oral administration is preferred, particularly in tablet or capsule form.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The temperatures in the following examples are set forth in degrees centigrade.

Example 1

Sodium methyl mercaptide, prepared from 2.3 g. of sodium and dried over $P_2O_5$ is dissolved in 40 ml. of absolute dimethyl sulfoxide mixed, in incremental portions, with a solution of 20 g. of 2-methyl-3-hydroxy-4-aminomethyl-5-bromomethyl-pyridine dihydrobromide in 200 ml. of absolute dimethyl sulfoxide. After allowing the reaction mixture to stand overnight, the solvent is distilled off under vacuum at a temperature not exceeding 40°, and the residue is treated with alcoholic hydrochloric acid and ether in the cold with thorough cooling. The thus-obtained 2-methyl-3-hydroxy-4-aminomethyl-5-methylthiomethyl-pyridine dihydrochloride melts at 260–262° and exhibits, in the infrared, absorption bands between 2500 and 3300 cm.$^{-1}$, between 1550 and 1500 cm.$^{-1}$, and between 1365 and 1200 cm.$^{-1}$. NMR spectrum: $\delta = 2.05$ (—$SCH_3$).

Example 2

Methyl mercaptan is introduced into a solution of 6.9 g. (0.3 mol) of sodium in 100 ml. of methanol, until saturation is obtained. The solution is then quickly mixed with a solution of 27.3 g. (0.1 mol) of N-methyl-pyridoxamine-5'-chloride dihydrochloride in 200 ml. of methanol. The mixture is allowed to stand overnight, thereafter heated for 45 minutes on a steam bath, and filtered while hot. From the residue of the filtrate remaining after the solvent has been evaporated, there is obtained, after the addition of alcoholic hydrochloric acid and ether, 35 g. of 2-methyl-3-hydroxy-4-methylaminomethyl-5-methylthiomethyl - pyridine dihydrochloride, M.P. 185°. The free base is obtained by alkalinization of the aqueous solution of the dihydrochloride and subsequent salting out. After recrystallization from ethyl acetate/hexane, the base melts at 84°.

Example 3

Three grams of 2-methyl-3-hydroxy-4-hydroxyiminomethyl-5-methylthiomethyl-pyridine hydrochloride is dissolved in about 80–100 ml. of glacial acetic acid. During the course of 5 minutes, 5 g. of oxide-free powdered zinc is added in small increments. The reaction mixture becomes heated to 70° during this procedure, the temperature being maintained below 75°. After the solution has cooled to 40°, another 5 g. of powdered zinc is added and the reaction mixture is once again heated to 70°. After cooling to 40°, 5 g. of powdered zinc is added for the third time. Thereafter, the reaction mixture is heated to 50°. Then, the mixture is cooled under running water, the solids filtered off and the filtrate is evaporated under vacuum. The residue is taken up in 40 ml. of water, and gaseous hydrogen sulfide is introduced until the zinc has completely precipitated. The zinc sulfide is filtered off and the filtrate is treated with activated charcoal, again filtered, and this filtrate is mixed with 15 ml. of concentrated hydrochloric acid. After evaporation under vacuum, the residue is mixed with alcoholic hydrochloric acid and ether. Upon cooling, the 2-methyl-3-hydroxy-4-aminomethyl-5-methylthiomethyl - pyridine dihydrochloride is obtained in crystalline form, M.P. 260–262°, yield: 2.5 g.

Preparation of the starting compound: 2.3 g. (0.1 mol) of sodium is dissolved in methanol, and then, under ice cooling, methyl mercaptan is introduced until saturation is attained. After the solvent has been removed under vacuum, the residue, consisting of solid sodium mercaptide, is dried over $P_2O_5$ under vacuum for 16 hours, then dissolved in 40 ml. of dimethyl sulfoxide dried with the aid of a 4 A. moleculor sieve, and mixed in incremental portions with a solution of 20 g. of 2-methyl-3-hydroxy-4-hydroxyiminomethyl-5-chloromethyl-pyridine or the hydrochloride thereof, in 200 ml. of absolute dimethyl sulfoxide. After allowing the reaction mixture to stand overnight, the reaction mixture is poured into about 2 l. of water, and the thus-separated, black-colored precipitate is vacuum-filtered (about 15 g., M.P. 203–205°). This precipitate is dissolved in methanol, mixed with activated charcoal, stirred for 15 minutes in the cold state, and then filtered. This procedure is repeated until the solution exhibits only a slightly brownish color. The combined filtrates are evaporated under vacuum, and the residue is recrystallized from alcohol, thus obtaining 2-methyl-3-hydroxy-4-hydroxyiminomethyl - 5 - methylthiomethylpyridine hydrochloride, M.P. 226°, yield: about 6 g. In the mixed melting point with the same product obtained in another manner, no depression of the melting temperature is observed. The IR spectra of both substances are identical, as well as the analyses thereof.

Example 4

1.05 g. of 2-methyl-3-hydroxy-4-hydroxyiminomethyl-5-methylthiomethyl-pyridine hydrochloride is catalytically reduced in 125 ml. of methanol with 0.7 g. of $PtO_2$ at a pressure of 3 atmospheres gauge. The hydrogen absorption is 200 ml. (the stoichiometric value for the absorption is 224 ml.). The main amount of hydrogen is absorbed in about 2 hours, and the total duration of the experiment is 5¼ hours. After the catalyst has been filtered off, the solvent is evaporated. From the residue, after treatment with alcoholic hydrochloric acid and ether, 2-methyl-3-hydroxy - 4 - aminomethyl - 5 - methylthiomethyl-pyridine dihydrochloride is isolated, M.P. 259–261°, yield: 0.3 g.

Preparation of the starting compound: Two grams of 2-methyl-3-hydroxy-4-formyl - 5 - methylthiomethyl-pyridine in 20 ml. of alcohol is added dropwise, with agitation, to a solution of 3 g. of hydroxylamine hydrochloride in 10 ml. of pyridine. Thereafter, the reaction mixture is stirred for 2 hours at 100°. The solvents are evaporated under vacuum, the residue is triturated with water, and the undissolved components are vacuum-filtered. These components melt, after recrystallization from alcohol, at 226°. Yield: 1.4 g. of 2-methyl-3-hydroxy-4-oximinomethyl-5-methylthiomethyl - pyridine hydrochloride.

Example 5

A yellow oil is obtained by catalytically hydrogenating 8.3 g. of 2-methyl-3-hydroxy-4-benzylideniminomethyl-5-methylthiomethyl-pyridine on 1 g. of platinum oxide in 250 ml. of methanol, filtering off the catalyst, and evaporation of the filtrate under reduced pressure. This yellow oil yields a crystallized dihydrochloride upon treatment with alcoholic hydrochloric acid. The thus-obtained 2-methyl-3-hydroxy - 4 - benzylaminomethyl-5-methylthiomethyl-pyridine dihydrochloride melts at 226° (from alcohol/ether).

By the catalytic hydrogenation of 8.35 g. of the thus-obtained 2-methyl-3-hydroxy - 4 - benzylaminomethyl-5-methylthiomethyl-pyridine on 1.2 g. of $PtO_2$ in 400 ml. of methanol under a pressure of 3–6 atmospheres gauge, the benzyl group is split off. After filtering off the catalyst and evaporation of the solvent, the residue is treated with alcohol hydrochloric acid and ether. The 2-methyl-3-hydroxyl-4-aminomethyl - 5 - methylthiomethyl-pyridine dihydrochloride, obtainable in this fashion in a quantitative yield, melts at 260–262°.

Example 6

Two grams of 2-methyl-3-hydroxy-4-formyl-5-methylthiomethyl-pyridine and 1.65 g. of anhydrous L-ephedrine base are dissolved in 50 ml. of benzene and heated under reflux with the use of a water trap for solvents of lower specific gravity until water no longer separates. The hot benzene solution is filtered and placed in a refrigerator to induce crystallization. Yield: 3.5 g. of 2-(2-methyl-3-hydroxy-5-methylthiomethyl-pyrid-4-yl) - 3,4-dimethyl-5-phenyloxazolidine, M.P. 150° (from ethyl acetate).

Forty grams of the thus-obtained oxazolidine compound is mixed with 400 ml. of 12.5% hydrochloric acid and heated under reflux for one-half hour to 80–90°. The resultant solution is filtered with charcoal in the hot condition and evaporated under reduced pressure. The residue is extracted thoroughly with petroleum ether (B.P. 50–70°). After removing the petroleum ether by evaporation, a yellow crystallized residue is obtained of 2-methyl-3-hydroxy-4-formyl-5-methylthiomethyl - pyridine, M.P. 53° (from hexane/ethyl acetate).

IR spectrum: bands at 1670 cm.$^{-1}$ ($\gamma$C=O, low position due to conjugation to the aromatic system).

In the NMR spectrum, instead of obtaining the signal of the methylene group contained in the starting compound, the signal of the aldehyde proton is obtained at $\delta=10.53$.

Example 7

3.9 g. (0.02 mol) of 2-methyl-3-hydroxy-4-formyl-5-methylthiomethyl-pyridine is dissolved in 100 ml. of benzene. Thereafter, 3.6 g. of benzylamine (0.034 mol) is added. The thus-obtained solution is boiled under reflux for 1 hour with the use of a water trap. After allowing the reaction mixture to stand overnight, the benzene is substantially distilled off under vacuum, and the mixture is mixed with hexane until clouding occurs. The crystals which separate after cooling are vacuum-filtered, thus obtaining 5.5 g. of 2-methyl-3-hydroxy-4-benzyliminomethyl-5-methylthiomethyl-pyridine, M.P. 68°.

Four grams of 2-methyl-3-hydroxy-4-benzyliminomethyl-5-methylthiomethyl-pyridine is heated with 40 ml. of 2 N hydrochloric acid for 1 hour under reflux, and then the reaction mixture is evaporated from the solvent under reduced pressure. The residue is neutralized with dilute sodium carbonate solution and then exhaustively extracted with petroleum ether (B.P. 50–70°). After washing, drying, and evaporation of the combined petroleum ether phases, a crystalline, yellow residue is obtained of 2-methyl-3-hydroxy-4-formyl - 5 - methylthiomethyl-pyridine (M.P. 53° after recrystallization from hexane/ethyl acetate).

In the IR spectrum, bands at 1670 cm.$^{-1}$ ($\gamma$CO, low position due to conjugation with aromatic pyridine system). In the NMR spectrum, instead of obtaining the signal of the methylene group contained in the starting compound, the signal of the aldehyde proton is obtained in the 4-position at $\delta=10.53$.

Example 8

144 g. of active manganese dioxide is added to a solution of 24 g. of 2-methyl-3-hydroxy-4-hydroxymethyl-5-methylthiomethyl-pyridine in 3 l. of chloroform, and this mixture is agitated overnight with an efficient stirrer (about 15–16 hours). Thereafter, solid components are filtered off, and the filtrate is evaporated under a vacuum at a temperature of 30–35°. The residue is exhaustively extracted with petroleum ether (B.P. 50–70°). Thereafter, the combined petroleum ether extracts are concentrated at 30–35°, and thoroughly cooled, the aldehyde being crystallized. Yield: 16 g. of 2-methyl-3-hydroxy-4-formyl-5-methylthiomethyl-pyridine, M.P. 53° (from hexane and several drops of ethyl acetate). NMR spectrum: $\delta=10.57$ (typical for aldehyde protons); IR spectrum: bands at 1670 cm.$^{-1}$ (typical for aromatic aldehydes).

Example 9

Four grams of 2-methyl-3-hydroxy-4-chloromethyl-5-methylthiomethyl-pyridine hydrochloride is dissolved in 500 ml. of chloroform, mixed with 16 g. of active manganese dioxide, and thereafter vigorously agitated at room temperature for 16 hours. After filtering off the solids, the filtrate is evaporated under a vacuum, and the residue is exhaustively extracted with petroleum ether. The petroleum ether phases are combined, concentrated to a small volume and thoroughly cooled. After allowing the reaction product to stand, 2.05 g. of 2-methyl-3-hydroxy-4-formyl-5-methylthiomethyl-pyridine crystallizes from the solution. Additional proportions of 2-methyl-3-hydroxy-4-formyl-5-methylthiomethyl-pyridine can be precipitated from the mother liquor with 2,4-dinitrophenylhydrazine reagent. After recrystallization from methanol/acetonitrile, the melting point of the 2,4-dinitrophenylhydrazone is 205°. The mixed melting point with a dinitrophenylhydrazone of 2-methyl-3-hydroxy-4-formyl-5-methyl-thiomethyl-pyridine produced in a different manner is not depressed. Also, the infrared spectrum of the thus-obtained dinitrophenylhydrazone of 2-methyl-3-hydroxy-4-formyl-5-methylthiomethyl-pyridine coincides with that of the compound prepared in a different fashion:

($\gamma$C=N: 1610 cm.$^{-1}$
$\gamma$C—NO$_2$: 1520 cm.$^{-1}$ and 1330 cm.$^{-1}$)

Example 10

Four grams of 2-methyl-3-hydroxy-4-N-methylaminomethyl-5-methylthiomethyl-pyridine is dissolved in 500 ml. of chloroform, thereafter mixed with 16 g. of MnO$_2$, and vigorously agitated at room temperature for 16 hours. After filtering off the solids, the filtrate is evaporated under vacuum, and the residue is exhaustively extracted with petroleum ether. The petroleum ether phases are combined, concentrated to a small volume, and thoroughly cooled, thus obtaining 1.97 g. of crystalline 2-methyl-3-hydroxy-4-formyl - 5 - methylthiomethyl-pyridine, M.P. 52–53°. From the mother liquor, additional proportions of 2-methyl-3-hydroxy - 4 - formyl-5-methylthiomethyl-pyridine can be precipitated with 2,4-dinitrophenylhydrazine reagent. After recrystallization from methanol/acetonitrile, the melting point of the dinitrophenylhydrazone is 203°. The mixed melting point with the dinitrophenylhydrazone of 2-methyl-3-hydroxy-4-formyl-5-methylthiomethyl-pyridine prepared in a different manner is not depressed.

Example 11

16 g. of 2-methyl-3-hydroxy-4-chloromethyl-5-methylthiomethyl-pyridine hydrochloride is added in incremental portions to a solution of 20 g. of dimethylamine in 160 ml. of benzene. The mixture is allowed to stand overnight and thereafter, the reaction solution is heated under reflux for 1 hour, with dimethylamine being simultaneously introduced. The dimethylamine hydrochloride which separates after cooling and allowing the mixture to stand is vacuum-filtered. The filtrate is evaporated under vacuum and the oily residue is converted, with alcoholic hydrochloric acid and acetone, into crystalline 2-methyl-3-hydroxy - 4 - (N,N-dimethylaminomethyl) - 5 - methylthiomethylpyridine dihydrochloride; yield: 14 g.; M.P. 198° (from alcohol).

Example 12

16 g. (0.063 mol) of 2-methyl-3-hydroxy-4-chloromethyl-5-methylthiomethyl-pyridine hydrochloride is introduced, in incremental portions and with stirring, into a solution of 9.2 g. (0.126 mol) of diethylamine in 160 ml. of benzene. Thereafter, the mixture is heated for 1 hour under reflux. Then, another 9.2 g. of diethylamine is added thereto. The mixture is again heated under reflux for 1 hour, and the diethylamine hydrochloride which precipitates after vigorous stirring is vacuum-filtered. The filtrate is evaporated under a vacuum and the residue is triturated with alcoholic hydrochloric acid and ether. The thus-crystallized 2-methyl-3-hydroxy - 4 - (N,N-diethylaminomethyl) - 5-methylthiomethyl-pyridine dihydrochloride is vacuum-filtered; yield: 8 g.; M.P. 77°. In the NMR spectrum, triplet of the ethyl groups at $\delta=1.33$, quartet at $\delta=3.22$.

Example 13

Five grams of 2-methyl-3-hydroxy - 4 - chloromethyl-5-methylthiomethyl-pyridine hydrochloride is dissolved in 100 ml. of alcohol with heating. Thereafter, the insoluble components are separated by filtration. The filtrate, after adding excess, saturated alcoholic ammonia thereto, is allowed to stand for 2 days in a refrigerator. The filtrate obtained after filtering off the precipitated ammonium chloride is mixed with alcoholic hydrochloric acid, whereupon, after further concentrating and cooling, 2-methyl-3-hydroxy-4-aminomethyl - 5 - methylthiomethyl-pyridine dihydrochloride crystallizes; M.P. 260–262° (from alcoholic hydrochloric acid).

Example 14

16 g. of 2-methyl-3-hydroxy-4-chloromethyl-5-methylthiomethyl-pyridine hydrochloride is dissolved in 160 ml. of benzene, and, under vigorous agitation, gaseous ammonia is introduced for 4 hours. After allowing the reaction mixture to stand overnight, the introduction of the gaseous ammonia is repeated for 1 hour, while heating the solution on a steam bath. After cooling, the mixture is filtered off from the separated components, and the filter cake is boiled several times with alcohol. The combined filtrates are evaporated under a vacuum, and from the residue, by treatment with alcoholic hydrochloric acid, ether and acetone, 7.5 g. of 2-methyl-3-hydroxy-4-aminomethyl - 5 - methylthiomethyl-pyridine dihydrochloride is isolated, M.P. 259–260° (from alcoholic hydrochloric acid).

Example 15

Two grams of 2-methyl-3-hydroxy-4-formyl-5-methylthiomethyl-pyridine, 25 ml. of 2 N hydrochloric acid, and 10 ml. of 40% formaldehyde solution are adjusted, under stirring, with the aid of 4 N sodium hydroxide solution, to a pH of 6.5. After allowing the reaction mixture to stand overnight in a refrigerator, it is vacuum-filtered, and recrystallized from ethyl acetate or acetonitrile. The 8-methyl-5-methylthiomethyl-4H - 4 - hydroxy-m-dioxino-[4,5-c]pyridine obtained in a quantitative yield, has a melting point of 130°.

In the IR spectrum of the final product, the aldehyde band of the starting product at 1670 cm.$^{-1}$ is not present any more, but there are bands at 1400 cm.$^{-1}$ and 935 cm.$^{-1}$ ($\gamma$ CH$_2$ of a methylene dioxide group), 1250 cm.$^{-1}$ and 1037 cm.$^{-1}$ (asymmetrical and symmetrical $\gamma$ C—O—C) and 1100 cm.$^{-1}$.

Analogously, under very thorough stirring and optionally with the addition of a solubilizer, starting with 2 g. of 2 - methyl - 3 - hydroxy - 4 - formyl - 5 - methylthiomethylpyridine, the following compounds are obtained:

(a) By reaction with 0.6 g. of acetone: 1.8 g. of 2,2,8-trimethyl - 5 - methylmercaptomethyl - 4H - 4 - hydroxy-m-dioxino[4,5-c]pyridine;

(b) By reaction with 0.8 g. of butanone-(2): 1.5 g. of 2,8 - dimethyl - 2 - ethyl - 5 - methylmercaptomethyl-4H-4-hydroxy-m-dioxino[4,5-c]pyridine;

(c) By reaction with 0.6 g. of freshly distilled propionaldehyde: 2.1 g. of 2 - ethyl - 8 - methyl - 5 - methylthiomethyl-4H-4-hydroxy-m-dioxino[4,5-c]pyridine;

(d) By reaction with 0.8 g. of freshly distilled butyraldehyde: 1.8 g. of 2 - propyl - 8 - methyl - 5 - methylthiomethyl-4H-4-hydroxy-m-dioxino[4,5-c]pyridine.

Example 16

Two grams of 2 - methyl - 3 - hydroxy - 4 - formyl - 5-methylthiomethyl-pyridine, 25 ml. of 2 N hydrochloric acid, and 10 ml. of 40% acetaldehyde solution are adjusted to a pH of 2 under agitation with the aid of 2 N sodium hydroxide solution. The reaction mixture is allowed to stand overnight in a refrigerator, and is then adjusted to a pH of 7. The thus-precipitated 2,8-dimethyl-5 - methylmercaptomethyl - 4H - 4 - hydroxy - m - dioxino[4,5-c]pyridine is vacuum-filtered; M.P. 126° and 153° (substance exhibits dimorphism).

IR spectrum: bands at 1400 cm.$^{-1}$, 1360 cm.$^{-1}$ ($\gamma$ CH of a methylene dioxide group) and 1085 cm.$^{-1}$; the band of the aldehyde group at 1670 cm.$^{-1}$ contained in the starting compound has disappeared.

NMR spectrum: doublet of the methyl group at $\delta=1.56$; quartet of the =CH group at $\delta=5.57$.

Analogously, under very thorough agitation and optionally with the addition of a solubilizer, the following compounds are obtained, starting with 2 g. of 2-methyl-3-hydroxy-4-formyl-5-methylthiomethyl-pyridine:

(a) By reaction with 1.1 g. of benzaldehyde: 2.3 g. of 2 - phenyl - 8 - methyl - 5 - methylthiomethyl - 4H - 4-hydroxy - m - dioxino[4,5-c]pyridine; characteristic IR bands at 756 and 702 cm.$^{-1}$;

(b) By reaction with 1.55 g. of p-nitrobenzaldehyde: 2.6 g. of 2 - (p - nitrophenyl) - 8 - methyl - 5 - methylthiomethyl - 4H - 4 - hydroxy - m - dioxino[4,5-c]pyridine; characteristic IR bands at 1538 and 1342 cm.$^{-1}$;

(c) By reaction with 1.20 g. of o-toluyl aldehyde: 2.5 g. of 2 - (o - methylphenyl) - 8 - methyl - 5 - methylthiomethyl-4H-4-hydroxy-m-dioxino[4,5-c]pyridine;

(d) By reaction with 1.4 g. of p-methoxybenzaldehyde: 2.1 g. of 2 - (p - methoxyphenyl) - 8 - methyl - 5 - methylthiomethyl-4H-4-hydroxy-m-dioxino[4,5-c]pyridine;

(e) By reaction with 1.9 g. of p-bromobenzaldehyde: 3.1 g. of 2 - (p - bromophenyl) - 8 - methyl - 5 - methylthiomethyl-4H-4-hydroxy-m-dioxino[4,5-c]pyridine;

(f) By reaction with 1.5 g. of m-chlorobenzaldehyde: 2.2 g. of 2 - (m - chlorophenyl) - 8 - methyl - 5 - methylthiomethyl-4H-4-hydroxy-m-dioxino[4,5-c]pyridine.

Example 17

Ten grams of 2 - methyl - 3 - hydroxy - 4 - dimethylaminomethyl - 5 - thiocarbamylthiomethyl - pyridine is heated with 100 ml. of 20% sodium hydroxide solution for ½ hour in a water bath, nitrogen being simultaneously passed through the solution. Thereafter, 15 g. of methyl iodide in 50 ml. of methanol is added to the thus-obtained solution of the corresponding 5-sodium thiomethyl compound. The mixture is allowed to stand for 12 hours at room temperature, then neutralized, and extracted three times with respetcively 30 ml. portions of ethyl acetate. The thus-obtained extract is dried with sodium sulfate and evaporated. As the residue, 5 g. of 2-methyl-3-hydroxy-4 - dimethylaminomethyl - 5 - methylthiomethyl - pyridine is obtained, which, after conversion into the dihydrochloride by treatment with alcoholic hydrochloric acid, exhibits a melting point of 198°.

Example 18

Ten grams of 2 - methyl - 3 - hydroxy - 4 - aminomethyl - 5 - acetylthiomethyl - pyridine is suspended in 100 ml. of 2 N solution of potassium hydroxide, and heated to the boiling point under agitation and in a nitrogen atmosphere. Thereafter, 10 g. of dimethyl sulfate is gradually added thereto in a dropwise fashion. The mixture is boiled for 30 minutes, and then cooled and neutralized; the thus-precipitated 2-methyl-3-hydroxy-4-aminomethyl - 5 - methylthiomethyl - pyridine is vacuum-filtered and converted into the dihydrochloride by reaction with hydrochloric acid; M.P. 260–262°.

Example 19

A solution of 8.6 g. of 4-ethoxy-5-sodiumthiosulfatomethyl-8-methyl-4H-m-dioxino[4,5-c]pyridine (the compound of Formula I wherein represents

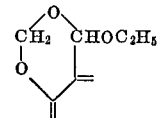

and X is SO$_3$Na) in 100 ml. of 4 N NaOH is mixed with powdered zinc with thorough stirring and with the simultaneous dropwise addition of 10 g. of dimethyl sulfate, until the corresponding S-methyl compound has precipitated from the solution. The thus-obtained suspension is acidified with 4 N alcoholic hydrochloric acid and heated to the boiling point for several minutes. The thus-obtained clear solution is then extracted exhaustively with petroleum ether (boiling point of 50–80°), and the combined petroleum ether phases are washed, dried and evaporated. The residue is recrystallized from hexane/ethyl acetate. The desired 2-methyl-3-hydroxy-4-formyl-5-methylthiomethyl-pyridine is obtained in the form of yellow crystals, M.P. 53°.

Example 20

15 g. (0.05 mol) of 2-methyl-3-hydroxy-4-dimethyl-aminomethyl-5-ethylxanthogenomethyl-pyridine (a compound of Formula I wherein $R_1$=OH and $$R_2=CH_2-N(CH_3)_2$$

and $$X \text{ is } -\underset{\underset{S}{\|}}{C}-OC_2H_5$$

is stirred in a nitrogen atmosphere at room temperature with 200 ml. of 0.5 N potassium hydroxide solution. Into this solution are added dropwise 0.07–0.08 mol of dimethyl sulfate. After this addition step is terminated, the reaction mixture is heated for 1 hour on a steam bath, and 2 N potassium hydroxide solution is added during this step so that the pH is maintained between 7.5 and 8. The reaction product is vacuum-filtered, thoroughly washed with water, dried, and converted into the dihydrochloride by treatment with alcoholic hydrochloric acid/ether. The thus-obtained 2-methyl-3-hydroxy - 4 - dimethylaminoethyl-5-methylthiomethyl-pyridine dihydrochloride melts at 198°.

Example 21

With agitation, 12.6 g. (0.16 mol) of dimethyl sulfate is gradually added dropwise to 100 ml. of 25% KOH, at room temperature or with slight heating. At the same time and at about the same rate, 14.0 g. (0.05 mol) of (2-methyl - 3 - hydroxy-4-methylaminomethyl-pyrid-5-yl)-methyl-isothiuronium chloride hydrochloride (above Formula I wherein $R_1$=OH, $R_2$=CH$_2$NHCH$_3$, and R is $-\underset{\underset{NH}{\|}}{C}-NH$)

is added thereto. Care is taken that the pH of the solution does not drop below 8 and the temperature of the solution does not exceed 35–40°. After the entire amount has been added, the reaction mixture is stirred for another ½ hour at room temperature, and is then filtered. The thoroughly washed precipitate of 2-methyl-3-hydroxy - 4 - methylaminomethyl-5-methylthiomethyl-pyridine is dried, optionally recrystallized from methanol, and converted into the dihydrochloride with alcoholic hydrochloric acid and ether, M.P. 185°, base M.P. 84°.

Example 22

14.95 g. (0.05 mol) of (2-methyl-3-hydroxy-4-diethyl-aminomethyl-pyrid-5-ylmethyl)-dithiourethane is stirred with 120 ml. of 2 N NaOH at room temperature, or optionally heated on a steam bath in order to have the splitting reaction take place in solution. Into this solution, 10.1 g. of dimethyl sulfate is added dropwise with agitation. The pH of the solution is maintained at a value of 7.5–8.5 by the addition of 2 N NaOH. After the dropwise addition is terminated, the reaction mixture is stirred for another 2 hours, without permitting the pH to drop below 7. The reaction product which separates is filtered off and washed free of alkali. Impurities can be removed by recrystallization from methanol and filtration of the hot solution. From alcoholic hydrochloric acid, after the addition of ether and after cooling, 2-methyl-3-hydroxy-4-diethylaminomethyl - 5-methylthiomethyl-pyridine dihydrochloride crystallizes, M.P. 188°.

Example 23

10.45 g. (0.05 mol) of 2-methyl-3-hydroxy-4-aminomethyl-5-thiocyanatomethyl-pyridine is mixed, in a round flask equipped with a stirrer, a reflux condenser and two dropping funnels and purged with nitrogen, with a few milliliters of a 20% solution of potassium hydroxide in alcohol/water 1:1. As soon as the temperature begins to rise, 10.1 g. (0.08 mol) of dimethyl sulfate is added dropwise. If necessary, potassium hydroxide is added in order to maintain the pH of the solution above 8. After the reaction has terminated, the precipitated 2 - methyl-3-hydroxy-4-aminomethyl-5-methylthiomethylpyridine is filtered off, optionally after being diluted with water, and converted into the dihydrochloride with alcoholic hydrochloric acid and ether (M.P. 260–262°).

Example 24

Sodium mercaptide (produced from 2.3 g. of sodium and dried over $P_2O_5$) is dissolved in 40 ml. of absolute dimethyl sulfoxide and mixed, in incremental portions, with a solution of 20 g. of 2 - methyl-3-hydroxy-4-aminomethyl-5-bromomethyl-pyridine dihydrobromide in 200 ml. of absolute dimethyl sulfoxide. After allowing the reaction mixture to stand overnight, the solvent is distilled off under vacuum at a temperature not exceeding 40°. The residue is treated with alcoholic hydrochloric acid and ether with thorough cooling. The thus-obtained 2 - methyl-3-hydroxy-4-aminomethyl-5-methylthiomethyl-pyridine dihydrochloride exhibits a melting point of 260–262°.

Example 25

Two grams of dimethylbenzyl (2-methyl-3-hydroxy-5-methylthiomethyl-pyrid-4-yl-methyl)ammonium chloride is dissolved in 100 ml. of glacial acetic acid and mixed with 5 ml. of concentrated hydrochloric acid. This solution is allowed to flow into 0.2 g. of hydrogenated PtO$_2$ suspended in 50 ml. of glacial acetic acid. The mixture is shaken until no further absorption of hydrogen takes place. The thus-hydrogenated solution is freed of the catalyst by filtration and evaporated under a vacuum. By subjecting the residue to a post-treatment with alcoholic hydrochloric acid and acetone, 0.8 g. of the debenzylated 2-methyl-3-hydroxy - 4 - (N,N-dimethylaminomethyl)-5-methylthiomethyl-pyridine dihydrochloride is obtained, M.P. 198°.

Example 26

Into a mixture of 16 g. of 2-methyl-3-hydroxy-4-chloromethyl-5-methylthiomethyl-pyridine and 160 ml. of benzene, methylamine is introduced until the gas is no longer absorbed. The introduction of the gaseous methylamine is continued for another 2 hours under heating with reflux. The methylamine hydrochloride which separates during cooling and after allowing the reaction mixture to stand is vacuum-filtered, and the filtrate is concentrated. Any further amounts of methylamine hydrochloride which separate are once again filtered. Finally, the solvent is completely removed by evaporation under a vacuum, and the remaining residue is treated with alcoholic hydrochloric acid and ether, whereby 2-methyl-3-hydroxy-4-methylaminomethyl - 5 - methylthiomethyl-pyridine dihydrochloride is obtained, M.P. 185°. The free base is obtainable by alkalinization of the aqueous solution of the dihydrochloride and subsequent salting out. After recrystallization from ethyl acetate/hexane, the free base melts at 84°.

In an analogous manner, using ethylamine, 2-methyl-3-hydroxy-4-ethylaminomethyl - 5 - methylthiomethyl-pyridine-dihydrochloride (M.P. 243°) is obtained. The corresponding base (pure according to thin layer chromatographic examination) is oily.

Example 27

16 g. (0.063 mol) of 2-methyl - 3 - hydroxy-4-chloromethyl-5-methylthiomethyl - pyridine hydrochloride and 10.7 g. of piperidine are dissolved in 160 ml. of benzene and heated under reflux for one hour with agitation. Thereafter, another 10.7 g. of piperidine is added, the reaction mixture is once again heated under reflux for one hour. After cooling, the separated piperidine hydrochloride is filtered off. The filtrate is evaporated under vacuum, and the residue is triturated with alcoholic hydrochloric acid and ether. The thus-obtained 2-methyl-3-hydroxy-4-piperidinomethyl - 5 - methylthiomethyl-pyridine dihydrochloride melts, after recrystallization from alcohol/ether, at 218°. Yield: 10 g.

Analogously, the following compounds are obtained from 16 g. of 2-methyl-3-hydroxy-4-chloromethyl-5-methylthiomethyl-pyridine hydrochloride:

(a) By reaction with a total of 18.5 g. of pyrrolidine: 11.2 g. of 2-methyl-3-hydroxy - 4 - pyrrolidinomethyl-5-methylthiomethyl-pyridine dihydrochloride;

(b) By reaction with a total of 26 g. of ethylbutylamine: 10.4 g. of 2-methyl-3-hydroxy-4-ethylbutylaminomethyl-5-methylthiomethyl-pyridine dihydrochloride;

(c) By reaction with a total of 33.2 g. of propylpentylamine: 15.6 g. of 2-methyl-3-hydroxy - 4 - propylpentylaminomethyl-5-methylthiomethyl - pyridine dihydrochloride;

(d) By reaction with a total of 33.2 g. of isopropylpentylamine: 15.6 g. of 2-methyl-3-hydroxy-4-isopropylpentylaminomethyl-5-methylthiomethyl - pyridine dihydrochloride;

(e) By reaction with a total of 26 g. of diisopropylamine: 7.3 g. of 2-methyl-3-hydroxy-4-diisopropylaminomethyl - 5 - methylthiomethyl-pyridine dihydrochloride; characteristic IR bands at 1380 cm.$^{-1}$;

(f) By reaction with a total of 33.2 g. of di-n-butylamine: 14.6 g. of 2-methyl-3-hydroxy-4-dibutylaminomethyl-5-methylthiomethyl-pyridine dihydrochloride.

Example 28

Gaseous ethylamine is introduced into a solution of 3.9 g. 2-methyl-3-hydroxy-4-formyl - 5 - methylthiomethylpyridine in 100 ml. benzene, which is refluxed together with a small amount of p-toluolsulfonic acid using a water separator.

After evaporation of the benzene 4.2 g. of yellow-green crystals of 2-methyl-3-hydroxy - 4 - ethylaminomethyl-5-methylthiomethylpyridine (M.P. 43°, from hexane) are obtained.

By catalytic hydrogenation with 1 g. PtO$_2$ in 250 ml. methanol, filtration of the catalyst and evaporation of the filtrate under reduced pressure an oily residue is obtained. By treating this residue with alcoholic hydrochloric acid the crystalline 2-methyl-3-hydroxy-4-ethylaminomethyl - 5 - methylthiomethyl-pyridine-dihydrochloride (M.P. 243°, from methanol/ether) is obtained in quantitative yield.

The preceding examples can be repeated with similar success by substituting the generically or specifically described reactants and/or operating conditions of this invention for those used in the preceding examples.

Pharmaceutical preparations.—Pharmaceutical preparations may be prepared as follows:

Example A

Tablet: one tablet contains:

|  | Mg. |
|---|---|
| 2 - methyl - 3 - hydroxy-4-ethyl-aminoethyl-5-methylthiomethyl-pyridine dihydrochloride | 100 |
| Corn starch | 80 |
| Lactose | 60 |
| Talc | 6 |

The ingredients are mixed and worked up to tablets according to standard methods.

Example B

Coated tablet: from the following ingredients, granules are prepared which are pressed to form a core:

|  | Mg. |
|---|---|
| 2-methyl - 3-hydroxy-4-dimethylaminomethyl-5-methylthiomethyl-pyridine dihydrochloride | 100 |
| Lactose | 60 |
| Potato starch | 50 |
| Magnesium stearate | 1 |
| Finely divided SiO$_2$ | 2 |

The core obtained is coated with sugar syrup in a conventional manner.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pyridine derivative of the formula

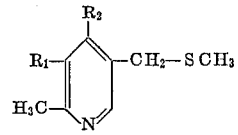

wherein R$_1$ is OH, R$_2$ is selected from the group consisting of CHO and —CH$_2$NR$_3$R$_4$ in which R$_3$ and R$_4$ each are selected from the group consisting of H, lower alkyl and, collectively, alkylene of 4 to 5 carbon atoms; salts or acid therapeutically acceptable addition thereof.

2. A therapeutically acceptable acid addition salt of a compound of claim 1.

3. A compound of claim 1 selected from the group consisting of 2-methyl-3-hydroxy-4-formyl-5-methylthiomethyl-pyridine and acid therapeutically acceptable addition salts thereof.

4. A compound of claim 1 wherein R$_1$=OH and R$_2$=—CH$_2$NR$_3$R$_4$.

5. A compound of claim 1 selected from the group consisting of 2-methyl-3-hydroxy-4-aminomethyl-5-methylthiomethyl-pyridine, 2 - methyl-3-hydroxy-4-methylaminomethyl-5-methylthiomethyl-pyridine, 2-methyl-3-hydroxy-4 - dimethylaminomethyl - 5 - methylthiomethyl - pyridine, 2-methyl-3 - hydroxy - 4 - ethylaminomethyl-5-methylthiomethyl-pyridine, 2-methyl - 3 - hydroxy - 4 - diethylaminomethyl-5-methylthiomethyl-pyridine, 2-methyl-3-hydroxy-4-ethylbutylaminomethyl - 5 - methylthiomethyl-pyridine, 2-methyl - 3-hydroxy-4-propylpentylaminomethyl-5-methylthiomethyl-pyridine, 2-methyl-3-hydroxy - 4 - diisopropylaminomethyl - 5 - methylthiomethyl-pyridine, 2-methyl-3 - hydroxy - 4 - dibutylaminomethyl-5-methylthiomethyl-pyridine, 2-methyl - 3 - hydroxy - 4 - pyrrolidino-methyl-5-methylthiomethyl-pyridine, and therapeutically acceptable acid addition salts thereof.

6. A hydrochloride acid addition salt of a compound of claim 5.

7. A compound as defined by claim 4, wherein R$_3$ and R$_4$, collectively, represent alkylene of 4 carbon atoms.

References Cited

Kraft et al.: Arzneimittel-Forsch, 11, pp. 922–9 (1961), abstracted by Chemical Abstracts, vol. 56, 9353-h-9354-i (1962).

ALAN L. ROTMAN, Primary Examiner

U.S. Cl. X.R.

260—293.69, 294.8 C; 424—263